(12) United States Patent
Vincent et al.

(10) Patent No.: US 9,787,654 B2
(45) Date of Patent: Oct. 10, 2017

(54) RESOLVING AUTHENTICATING ISSUES WITH A SECOND DEVICE

(71) Applicant: MICROSOFT TECHNOLOGY LICENSING, LLC, Redmond, WA (US)

(72) Inventors: Benjamin R. Vincent, Kirkland, WA (US); Adrian Frei, Seattle, WA (US); James Shang Kai Chou, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 61 days.

(21) Appl. No.: 14/927,232

(22) Filed: Oct. 29, 2015

(65) Prior Publication Data

US 2017/0126640 A1    May 4, 2017

(51) Int. Cl.
H04L 29/06     (2006.01)

(52) U.S. Cl.
CPC ............ H04L 63/06 (2013.01); H04L 63/083 (2013.01); H04L 63/0853 (2013.01); H04L 63/0861 (2013.01); H04L 63/10 (2013.01)

(58) Field of Classification Search
CPC ....... H04L 63/06; H04L 63/10; H04L 63/083; H04L 63/0853; H04L 63/0861
See application file for complete search history.

(56) References Cited

U.S. PATENT DOCUMENTS

| | | |
|---|---|---|
| 2013/0198822 A1 | 8/2013 | Hitchcock et al. |
| 2014/0189827 A1 | 7/2014 | Popovich et al. |
| 2014/0189840 A1 | 7/2014 | Metke et al. |
| 2014/0189841 A1 | 7/2014 | Metke et al. |
| 2016/0030199 A1* | 2/2016 | Hunt ...................... A61F 2/3662 623/23.42 |
| 2016/0344730 A1* | 11/2016 | Holz ................... H04L 63/0876 |

OTHER PUBLICATIONS

International Search Report and Written Opinion issued in PCT Application No. PCT/US2016/058334 mailed Dec. 8, 2016.
International Preliminary Report on Patentability issued in PCT Application No. PCT/US2016/058334 mailed Mar. 21, 2017.

* cited by examiner

Primary Examiner — Beemnet Dada
(74) Attorney, Agent, or Firm — Workman Nydegger

(57) ABSTRACT

Authenticating issues involving the re-authenticating of a first device that was previously authenticated are resolved by use of a second device which receives a notification of the failed authentication. The second device sends a response to the notification which is operable to facilitate re-authentication of the primary device and without requiring the user to provide credentials at the first device prior to obtaining the re-authentication at the primary device and/or without requiring the primary device to obtain a code to be entered into the secondary device and/or prior to the primary device being notified of a failure condition associated with the primary device.

20 Claims, 7 Drawing Sheets

Registered Devices ⌐ 310

| User ID | Device ID | Device Type | Notification Policy | Token/ Credential | Failure Condition(s) | Authentication Status |
|---|---|---|---|---|---|---|
| — | — | — | — | — | — | — |
| — | — | — | — | — | — | — |
| — | — | — | — | — | — | — |
| ... | ... | ... | ... | ... | ... | ... |

*Figure 3A*

User Account Data ⌐ 320

| User ID | Credential (1) | Credential (2) | Credential (3) |
|---|---|---|---|
| — | — | — | — |
| — | — | — | — |
| — | — | — | — |
| ... | ... | ... | ... |

RESOLVING AUTHENTICATING ISSUES WITH A SECOND DEVICE

BACKGROUND

Computers and computing systems have affected nearly every aspect of modern living. Computers are generally involved in work, recreation, healthcare, transportation, entertainment, household management, etc.

Computing system functionality can be enhanced by networking with other computing systems via network connections. These network connections, for instance, allow a computing system to access services, like multimedia content and other services, remotely from one or more networked service providers.

Typically, a user must authenticate their computing devices (e.g., a console like Microsoft's Xbox®, a mobile phone or other user device) to an identity provider in order to be granted access, through their devices, to the remote services that are being requested by the user.

In some instances, the service provider (which provides the requested services) and the identity provider (which authenticates the user devices) are a single entity. In other instances, they are different networked entities.

Some authentication processes, require a user to register their device to their user account before their device will be authenticated to receive requested services. In such instances, the user must first provide personal user credentials to the identity provider through the device that is intended to be registered/authenticated. The identity provider then sends back a code to this device, which is displayed to the user. The user must then initiate communications with the identity provider from a second device and enter this code into the second device. The code is then transmitted back to the identity provider, validating the user's receipt of the code through the first device. One implementation of the foregoing authentication process includes the OAuth protocol.

Authentication of a device can be limited to a single service or a suite of services. Device authentication can also be limited to a specific session, duration of time and/or for specific users. Registration records corresponding to the terms and policies of the authentication are stored at the identity provider so that that identity provider can automatically re-authorize and/or validate the device for any new service requests that are received, as appropriate.

Sometimes, the authenticated device will also store authentication credentials, which are received from the identity provider during the authentication process, and which can be included with subsequent service requests to validate the authenticated status of the device.

In some instances, the authentication state of a device can be downgraded, terminated or otherwise changed to an unauthenticated state when security policies change, when user credentials change, when device profiles change, when a session ends, and/or in response to other expiration and security conditions.

When the authentication state of a device is downgraded or eliminated, the user must re-authenticate their device through the OAuth protocol processes or other authentication processes previously described (e.g., enter user credentials at the first device, obtain a code provided to the first device, initiate communications with the provider from a second device, enter the code at the second device, etc.).

This re-authentication process can be cumbersome and an inefficient use of computer resources and user time. Accordingly, there is an ongoing need for improved methods for re-authenticating user devices.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

As described herein, various methods, systems and storage devices are provided for resolving authenticating issues of a first device with a second device. In some instances, the authenticating issues involve re-authenticating a primary device that was previously authenticated by notifying one or more secondary devices of an authentication failure event involving the first device. The secondary device is a device that is associated with the user or primary device with stored account data. The re-authentication is then completed in response to an identity provider or a service provider receiving a response to the notification from the secondary device, without requiring the user to re-enter their credentials at the primary device and/or without requiring the user to obtain a new code at the primary device for entry at the secondary device and/or without and/or without even notifying the primary device of the authentication failure. It will be appreciated that this can help save computing resources and improve user convenience for obtaining network services.

Additional features and advantages will be set forth in the description, which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 3A illustrates an example of a database table having authentication data;

FIG. 3B illustrates another example of a database table having authentication data;

DETAILED DESCRIPTION

Some aspects of the disclosed embodiments are operable to solve technical problems associated with re-authenticating devices in response to detected authentication failure events.

Some existing systems resolve authentication failures by requiring a user to repeat the same set of authentication steps that are required during initial authentication/registration of a device. For instance, existing systems resolve authentication failures by having a user re-enter their user credentials at a device to be re-authenticated in order to obtain a new code from a remote authentication service. The user then re-initiates communications with the authentication service from a second device and enters the received code into the second device. Once the authentication service receives the code from the second device, the authentication service re-authenticates the user device. As indicated previously, this process is undesirably cumbersome, particularly in circumstances where frequent re-authentication is required.

Some embodiments of this disclosure provide technical effects and advantages over the known art by helping to alleviate some of the inconveniences associated with re-authenticating user devices. The technical effects that can be realized include improved user convenience and efficiency gains through a reduction in the quantity of computer interactions and/or processing that is required to re-authenticate a user device.

By way of example, requirements for time and other computing resources can be reduced by eliminating the need for the user to perform the entire OAuth process during re-authentication of a device (e.g., without requiring the user to re-enter their credentials at the first device in order to obtain a new code at the first device, without requiring the generation of a new code to be entered at the second device, and without requiring the user to enter the code at the secondary device for each re-authentication). By eliminating some of these steps, the convenience of accessing network services can be greatly improved.

Various methods, computing systems and storage devices will now be described with reference to the disclosed embodiments for resolving authenticating issues with a second device.

Computing Environment

In this description and in the claims, the term "computing system" is defined broadly as including any device or system (or combination thereof) that includes at least one physical and tangible processor, and a physical and tangible memory capable of having thereon computer-executable instructions that may be executed by the processor.

Figure 1:
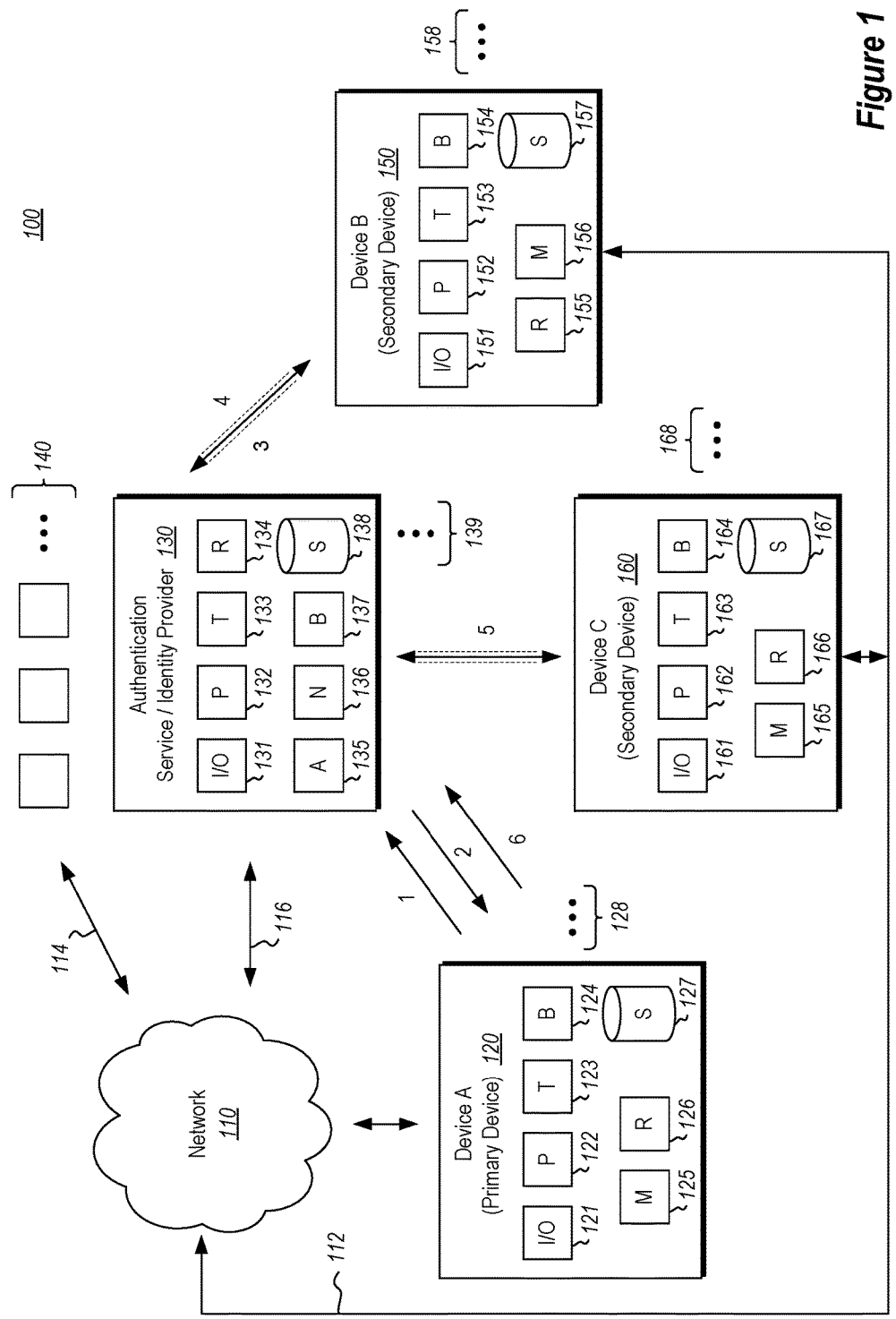
FIG. 1 illustrates an example of a computing environment which is usable to implement aspects of the disclosed embodiments for resolving authenticating issues with a second device.

FIG. 1 illustrates a computing environment 100 that includes various computing systems that are interconnected over a network 110 and that are operable to communicate through network connections (112, 114, 116) to implement the claimed embodiments of this disclosure. These network connections include any combination of wired and wireless connections and communication channels.

The specific computing systems shown in FIG. 1 include one or more primary device(s) (120, 128) in communication with one or more authentication service provider or identity provider(s) (130, 139) which are configured to authenticate the primary device(s), such that the primary devices are able to obtain requested network services directly from the identity provider(s) or from one or more other network service provider(s) (140) which are remotely located from the identity provider(s).

The illustrated computing environment also includes one or more secondary devices (150, 158, 160, 168) that can help facilitate initial authentication of the primary device(s) and which can also help resolve authenticating issues resulting from a failure of the previous authentication according to the present disclosure.

Each of the computing systems (120, 128, 130, 139, 150, 158, 160 and 168) is configured with hardware and software to facilitate performance of the claimed embodiments. For instance, each of the computing systems include I/O hardware and software interfaces and components (121, 131, 151, 161) for receiving input and for rendering output as described herein with reference to each of those computing systems. The I/O components include graphical user interfaces, displays, audio speakers, microphones, keyboards, touch pads, touch screens, mouse and pen devices, biometric sensors, tactile and haptic feedback devices and/or any other interface component that is operable to render output or receive input.

Each of the illustrated computing systems also includes one or more hardware processors (122, 132, 152 and 162) that are specifically configured for executing corresponding computer-executable instructions that are stored in the hardware storage systems (127, 138, 157, 167) of the computing systems to facilitate the implementation of the disclosed embodiments and for otherwise implementing the functionality described herein.

Each of the computing systems also includes a transmitter (123, 133, 153, 163) which includes hardware and software components for inter-transmitting data between the different computing systems/devices and for intra-transmitting data between the different components within each computing system/device. Accordingly, when any data is described as being transmitted or sent, it is sent by one of the transmitters. The transmitters can translate, format, encode and multiplex data prior to being transmitted.

Each of the computing systems also includes a receiver (126, 134, 155, 166) which includes hardware and software components for receiving data sent between the different computing systems and for receiving data between the different components within each computing system. Accordingly, when any data is described as being received, it can be received by one of the receivers. These receivers can also translate, format, decode and de-multiplex any of the transmitted data.

The computing systems also include corresponding hardware buses (124, 137, 154, 164) which are operable to carry communications between the different system components.

Finally, each of the computing systems also include one or more specialized modules (125, 135, 136, 156, 165) which are operable to facilitate and perform the various functions described in the claims. These modules (which can be stored in storage systems 127, 138, 157, 167) are executable modules that include specialized objects, routines, methods, function calls and APIs that are executable by the hardware processors (122, 132, 152, 162) to facilitate the functionality described herein for resolving authenticating issues, sometimes automatically and/or in response to conditional triggers, as also described. In some instance, the modules are configured as computer-executable instructions in the form of binaries, intermediate format instructions such as assembly language, or even source code, and may be implemented as separate threads.

The specialized modules can include an authentication module (135) and a notification module (136) which are configured to authenticate devices and to generate notification of authentication failures, respectively, in response to certain conditions, as described herein. The authentication module (135) performs credential validation and device identification validation, in some instances, by scanning stored databases (e.g., in storage devices 127, 138, 157, 167) and by comparing stored data with data received from the primary or secondary devices.

During implementation, the authentication module (135) operates with the receiver (134) to receive authorization requests from the primary device and to authenticate the primary device or to fail the authorization request, depending on the circumstances. The authentication module (135) also re-authenticates the primary device, when appropriate, as described herein, based on receiving a notification response from the one or more secondary devices which are associated with the user by user account information stored in the one or more user account databases.

The notification module (136) generates notifications that are provided to the secondary device with the transmitter (133) and, in some instances, the primary devices, regarding authentication failures in response to detecting a failure event based on stored authentication policies and data in the stored databases in the storage devices. These notifications can also be generated, in some instances, in response to receiving a notification of a failed authentication event from a remote entity. The notifications are generated in such a way as to be formatted and addressed to the appropriate devices, as defined by the notification policies and other data accessed in the stored databases.

In some instances, the notification is automatically sent with the transmitter (133) to the secondary device(s) associated with the user based on triggering conditions defined in the stored databases. In other embodiments, the notifications are provided to the user, passively, in response to the user accessing the service provider through a network interface.

The notification module (136) also works with the receiver (134) to receive notification response from the one or more secondary devices, which are described in more detail below.

Although not specifically shown, the module(s) (156) of the secondary device (150) can also include a notification module that operates with a receiver (155) to receive the notifications from the identity provider and that operates with the transmitter (153) to generate and transmits a notification response to the identity provider which is operable to cause the identity provider to re-authenticate the primary device to the service provider.

The storage devices (e.g., 127, 138, 157, 167) include any combination of physical system memory, which may be volatile, non-volatile, or some combination of the two. These storage devices can also include non-volatile mass storage. If a particular one of the computing systems is distributed, the processing, memory and/or storage devices may be distributed as well.

In the description that follows, embodiments are described with reference to acts that are performed by one or more computing systems. If such acts are implemented in software, one or more processors of the associated computing system that performs the act(s) direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the storage devices described above.

While computer-readable media can be any available media that can be accessed by a general-purpose or special-purpose computer system, computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical hardware storage devices that store computer-executable instructions and/or data structures. Physical hardware storage devices include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the functionality of the disclosed embodiments.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media.

Those skilled in the art will appreciate that the principles described herein may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Alternatively, or in addition, the functionality described herein can be performed, at least in part, by one or more hardware logic components. For example, and without limitation, illustrative types of hardware logic components that can be used include: Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Various methods for implementing the disclosed embodiments will now be described.

Resolving Authenticating Issues

Initially, a primary device, such as Device A (120) is authenticated to receive network services, such as delivery of multimedia content, transaction services, and other requested services. These services are provided from the authenticating entity (e.g., identity provider 130) directly, and/or from a networked service provider (140) that has arranged for the authentication of user devices by the identity provider (130). One or more secondary devices, such as Device B (150) or Device C (160) are associated with the user account and/or the primary device. Then, after the primary device become unauthenticated for any given reason, the secondary device can be utilized for re-authenticating the primary device, without requiring the user to re-enter their credentials at the primary device and/or without requiring the user to obtain a new code at the primary device for entry at the secondary device and/or without and/or without even notifying the primary device of the authentication failure.

The various steps for authenticating and re-authenticating user devices will now be described with specific reference to communication lines 1 thru 6 of FIG. 1 and communication lines 201 thru 205 of FIG. 2.

As shown in FIG. 1, a first request for authentication (line 1) is submitted from a primary device (120) to an identity provider (130). This request includes a user's credentials associated with a user account, which are stored in a database of the identity provider after being received. Then, the identity provider sends a response to this request (line 2) with a code which is displayed to the user and entered by the user into a secondary device, such as device 150. The code is then transmitted back to the identity provider (line 3).

In existing systems, the foregoing three steps (i.e., entering credentials, obtaining code at first device, submitting code with different device) are typically repeated each time a device re-authenticates after an authentication failure. These steps do not, however, have to be repeated according to the present disclosure by further implementing the following steps.

During communications with the identity provider (130), the secondary device (150) transmits and receives one or more communications with the identity provider (130) (shown as line 4), during which the secondary device becomes registered with or otherwise associated with the primary device(s) and/or user account. Registration and account data is stored in one or more tables, such as tables 310 and 320 of FIGS. 3A and 3B.

In some instances, the registration process is an automatic registration process, by the identity provider 130 extracting device identification information from communication packets received from the secondary device automatically. The identity provider can also extract and record notification channel information for communicating with the secondary device at a later time. Parameters for establishing the communication with the secondary device over the notification channel can also be established, automatically or manually.

In some embodiments, the identity provider provides a user interface that displays prompts for a user to enter device information and or the communication channel information during the communications (line 4), thereby initiating the registration process. A user can also initiate a request for a device to become registered, by selecting a registration button on a user interface of the identity provider, such that registration is only initiated in response to receiving the user input requesting the registration. Device identity information and user account data can also be entered through one or more specialized interfaces that are displayed to the user at the secondary device and which include selectable objects (for selecting registration processes) and display fields (for inputting registration data about the device to be registered).

In some embodiments, the secondary device (e.g., Device B 150) is also be used to enter information about one or more alternate secondary devices (e.g., Device C 160) to be registered and associated with the user account and/or primary device(s). Alternatively, or in combination, the alternate secondary device(s) can provide some or all of the registration data needed for registering the device through interfaces of the identity provider, in direct response to receiving a notification from the identity provider, and/or in response to the user initiating communication with the identity provider through the alternate secondary device(s) (shown at line 5).

In yet another embodiment, the registration information is provided through the primary device during the initial authentication request and/or during subsequent communications with the identity provider.

Registering the device includes storing device identification information in one or more database in such a manner that it is associated with the primary device(s) and/or specified user(s) of the primary device(s). During the registration process, it may be required, in some embodiments, for the user to provide user credentials that validate the identity of the user and user account. In some instances, different user credentials (e.g., password, biometric attributes, voice patterns, etc.) are associated with a single user, as shown in table 320, which may correspond to different levels of security/authentication that are required for different service requests and/or security conditions. The different user credentials may also be used to accommodate different user preferences with regard to the manner in which they are authenticated (e.g., preference to provide speech input or a fingerprint scan as opposed to typing a password).

Once a secondary device is registered, it is configured to help resolve future authenticating issues resulting from authentication failures of the user's other devices (e.g., Device A 120) and/or in response to a subsequent authentication request for new or continued services (line 6).

This can be done, according to some embodiments, by notifying the registered secondary device(s) of the authentication failure and further in response to receiving a notification response from one or more of the registered secondary device(s). This will be explained in more detail with regard to FIG. 2.

Figure 2:
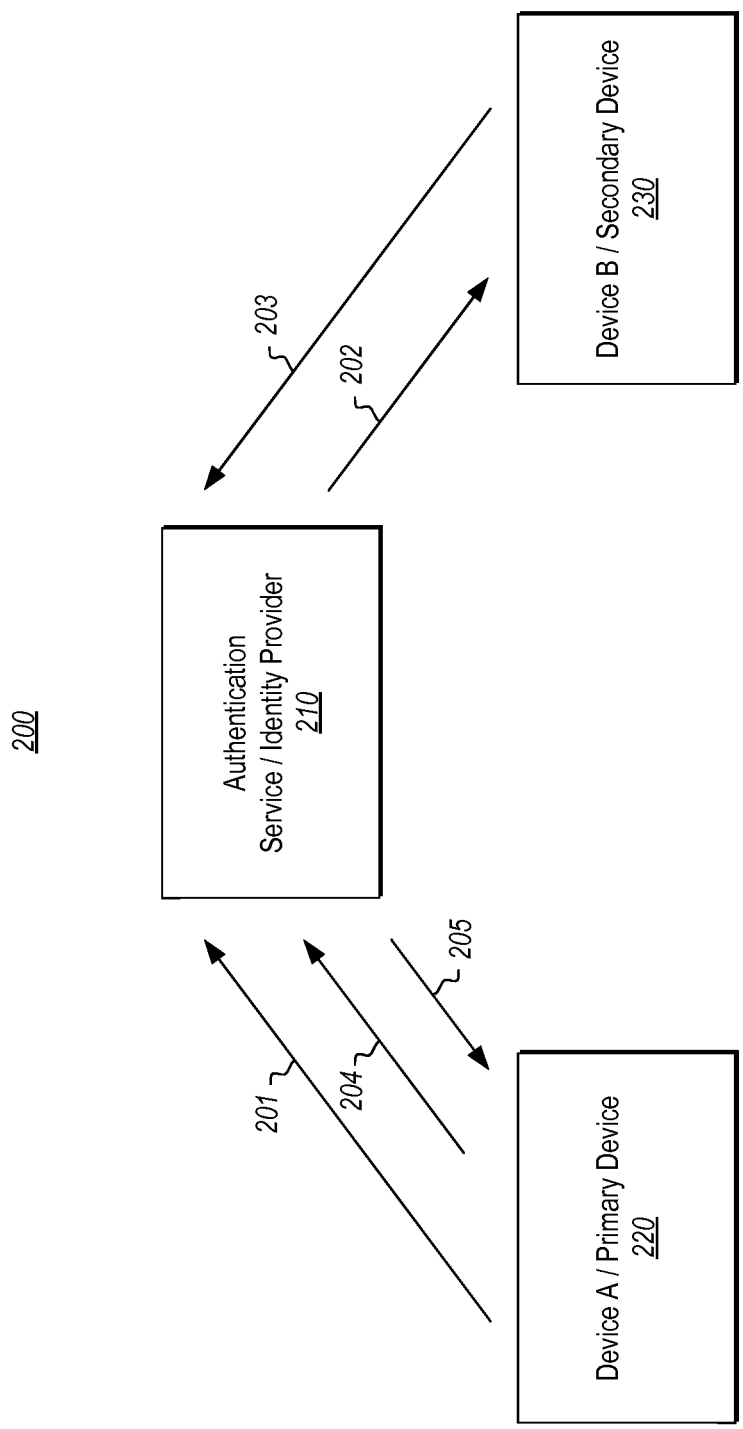
FIG. 2 illustrates an another example of computing environment which is usable to implement aspects of the disclosed embodiments for resolving authenticating issues with a second device.

Attention will now be directed to FIG. 2, which shows a simplified computing environment 200 to further clarify how authenticating issues for a first device can be resolved by using a second device. In this embodiment, Device A 220 requests a new service or submits a communication to the Identity Provider (210) corresponding to an existing service (201).

The Identity Provider (210) fails the request or communication (201) due to one or more detected failure conditions, which are defined by stored policies and other stored data defining the failure conditions. These failure conditions can include, but are not limited to a detected change in user credentials, a detected change in security protocols, a detected update to the primary device or service, a change in device identification information, a change in network settings, a session termination, a user request for unauthorized or restricted services or resources, an expiration of an account or credential term, a change in security protocols, a request for a financial purchase or other financial transaction, a service provider request having specific attributes, or any other failure condition. The various policies and failure conditions are stored in tables and other data structures accessible to the Identity Provider (210), such as tables 310, 320 and other similar tables.

The Identity Provider (210) generates one or more notification regarding the failure in response to the detected failure condition. In some instances, the Identity Provider 210 detects the failure condition itself. In other instances, the Identity Provider 210 is notified of the failure condition by one or more other entities that are remotely connected to the Identity Provider (e.g., security or network administrators, the primary or secondary devices, third party systems, and so forth).

Notification policies regarding content, formatting, timing, recipients, communication/notification channels, notification type (e.g., email, SMS, user interface, etc.) to use for the notification are stored in tables and other data structures accessible to the Identity Provider (210), such as tables 310, 320 and other similar tables. The notification policies can indicate, in some instances, the specific information to be requested in the notification and which must be provided from a registered secondary device, such as whether the user must provide textual confirmation input, verbal confirmation input, user interface input, etc.

In some instances the notification is sent automatically in response to detecting the failure condition. In other instances, the notification is only sent after a predetermined time that is designated for permitting the primary device or network to self-resolve a failure condition and upon verifying that the failure condition continues to persist after the predetermined time has lapsed. The predetermined time can be seconds, minutes, hours or any other predetermined period of time.

The delay period can also be a variable time, based on a communication period (e.g., a session), a computer cycle (e.g., CPU cycles), or other condition.

The delay period (whether predetermined or variable) can be particularly helpful when the failure condition is an erroneous failure condition or one that results from a temporary communication failure, to provide meaningful time to resolve the issue without requiring any additional processing from the secondary device(s).

In some instances, multiple different notifications are sent to multiple different secondary devices. In other instances, a single notification is sent to a single secondary device. When the primary device is associated with multiple secondary devices, the Identity Provider further evaluates the notification policies in the stored tables or other database structures to determine preferences for which of the multiple secondary devices is to receive the notification and how it is to be formatted and sent.

In some instances, a notification is only provided to a Secondary Device and/or user passively (e.g., in a pull paradigm), such that the notification is only provided after the user initiates communication with the Identity Provider and accessing an Identity Provider interface through the secondary device. The notification can also be sent to one or more third parties based on preferences and settings specified by the stored account data.

In some instances, the notification comprises a user interface/interface object or instructions or code for rendering the interface/object, which is displayed to the user at the Secondary Device and which is selectable by the user to acknowledge or confirm a desired authentication state for the Primary Device to obtain requested services. For instance, the user can be presented the user interface object (e.g., a yes/no button interface or another interface, for validating authorization privileges) in an interactive display at the Secondary Device. The user can then select the object(s) that reflect the user intent to authorize or to reject authorization for the requested services for the Primary Device. These requested services can include access to multimedia content, performance of a financial transaction, or any other service that is requested by the Primary Device.

In response to the user input (e.g., a user selection of an object), or in response to automatic triggers set in place, the Secondary Device provides a notification response (line 203). This notification response can be sent off automatically, without notifying the user. Alternatively, the notification response can be delayed until user input is received.

In some instances, the response to the notification is sent automatically upon detecting a predetermined condition exists at the secondary device, such as a user biometric condition detectable by the secondary device, a proximity state between the secondary device and the primary device, a status of connectivity between the secondary device and the primary device, etc.

The notification response can include any information that is usable to acknowledge receipt of the notification of the failure condition and/or to authorize the authentication state of the primary device. In this regard, the notification response will typically include any information that is specifically requested by the notification.

In some instances, the Secondary Device sends the notification response with device identifier information (e.g., device serial number, model, device location, hardware and/or software configuration, network address information, etc.) and/or authentication credentials (e.g., passwords, user names, etc.) to the Identity Provider.

In some instances, the notification response includes an indication of a user selection from a user interface (e.g., selection of a yes button or a no button or another object). An SMS reply or other text message reply (or email reply) can also comprise adequate authorization from a user to validate the authentication state of a primary device.

In some instances, the notification response includes data detected by the Secondary Device and/or provided by the user, such as nonconventional authorization credentials (e.g., biometric credentials, voice pattern data, facial recognition data, retina recognition data, fingerprint data or other nonconventional authorization credentials).

The Identity Provider can then update the stored tables and data structures to reflect the data received with the notification response, including updated tokens/credentials and other authentication status elements that reflect authentications for specific users and devices. For instance, the identity provider can parse the notification response to extract the relevant authorization data that is used to update the authentication status of the user/device account stored in the databases.

The updated data is then used to verify authorizations for requested services or to deny authorizations for requested services, depending on whether the user or secondary device confirmed authorizations are permitted or not.

In some instances, authorization for upgrading the authentication status of a user or primary device (e.g., re-authorizing the primary device) will only be updated/granted upon receiving response notifications from a plurality of secondary devices. In other instances, the authentication status of a user or primary device will be updated/granted upon receiving a single response notification from an associated secondary device.

In some instances, authorizations for re-authorizing the primary device will only be granted when the notification response is received within a predetermined period of time after the notification is first sent to the secondary device(s), as defined by expiration attributes of the notification and as defined by the stored policy data.

After the requisite authorizations are received from the secondary device(s), the requested services are then sent to the user by the Identity Provider and/or service provider. Alternatively, the requested services may only be provided after the Primary Device requests the services again, in a subsequent request (line 204). In some implementations, the requested services are sent or provided by performing a requested transaction, by providing requested content, or by providing other requested services, such as shown by line 205.

Figure 4:
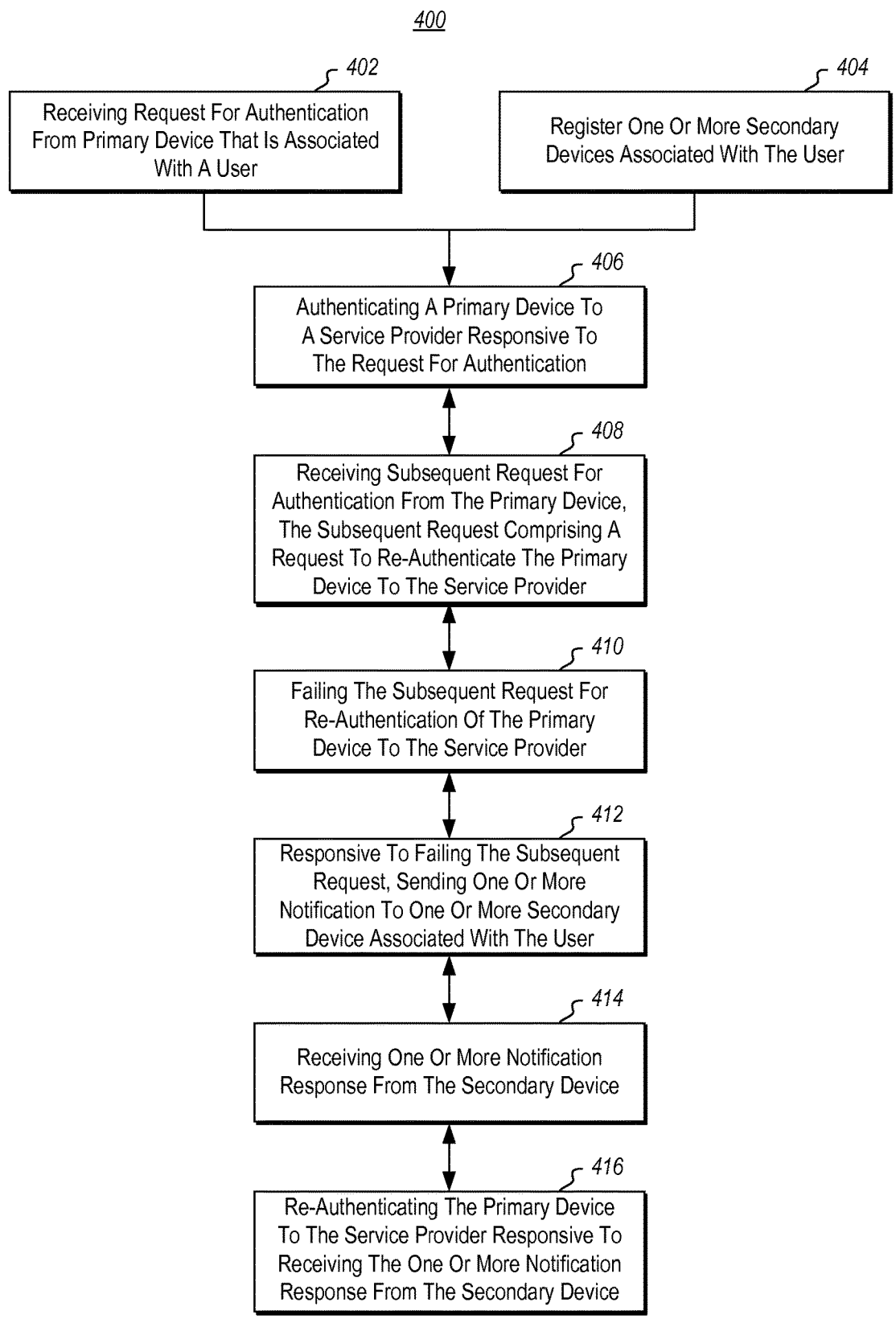
FIG. 4 illustrates a flowchart of acts associated with resolving authenticating issues with a second device.
Figure 5:
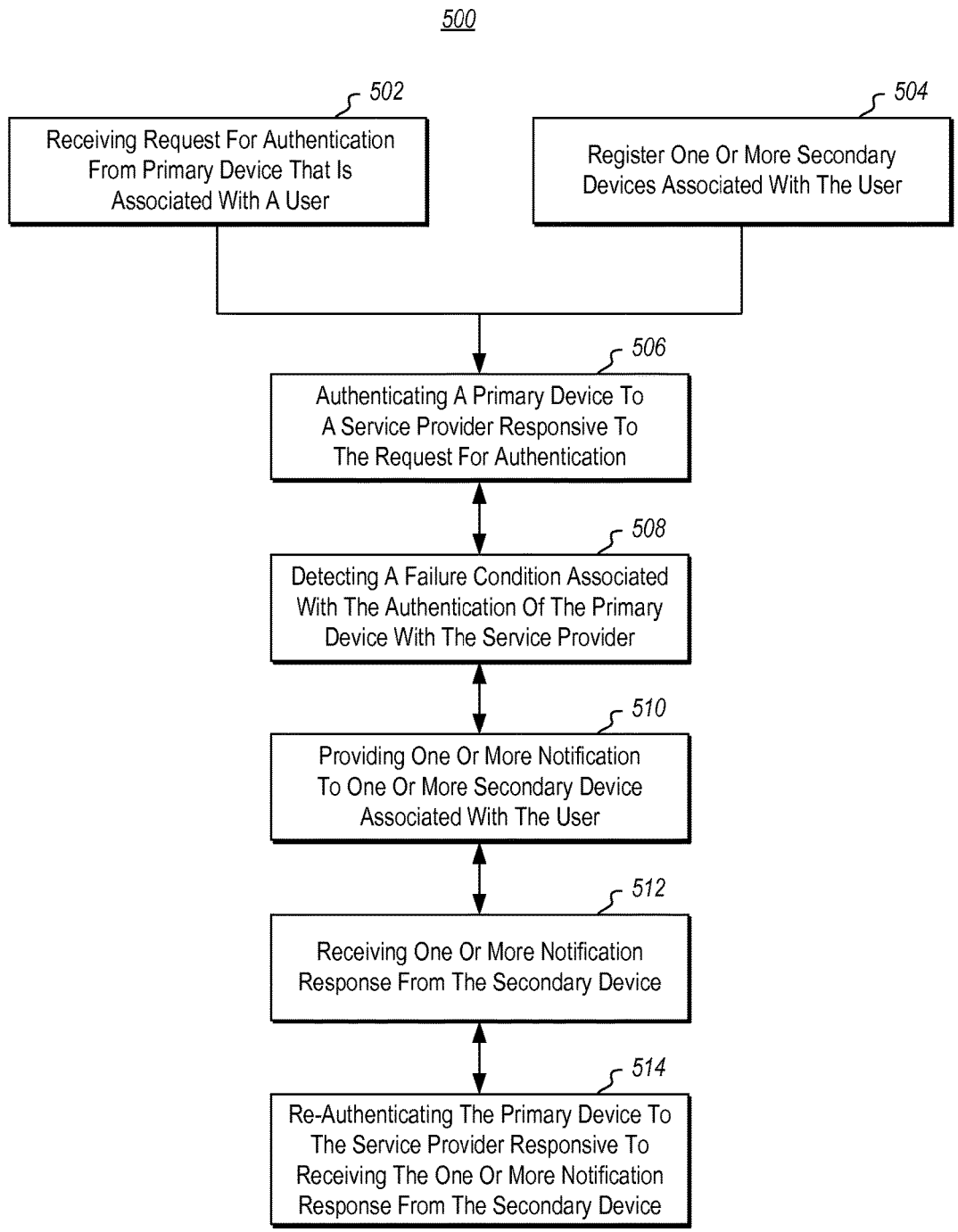
FIG. 5 illustrates a flowchart of acts associated with resolving authenticating issues with a second device.
Figure 6:
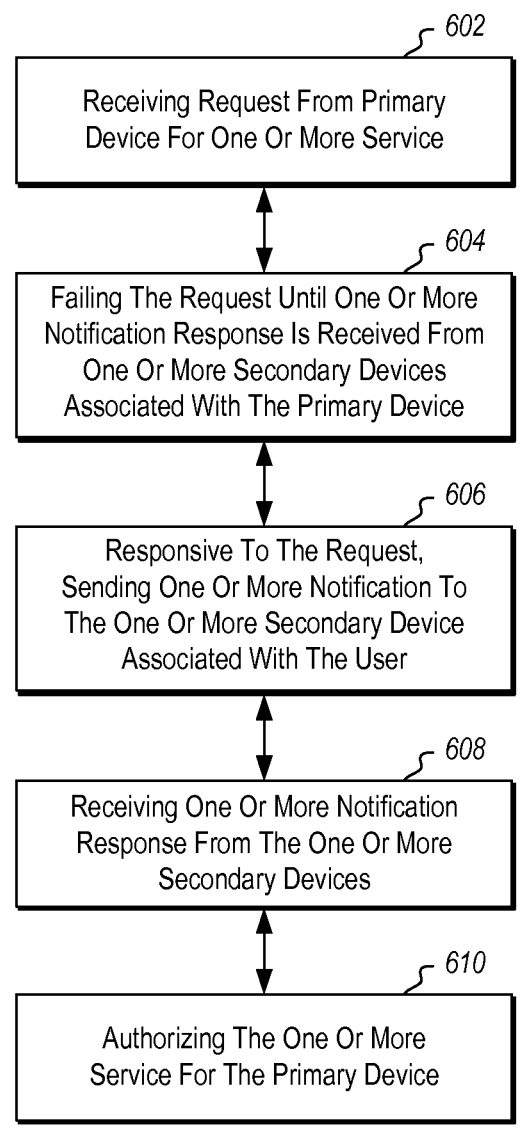
FIG. 6 illustrates a flowchart of acts associated with resolving authenticating issues with a second device.

Attention will now be directed to FIGS. 4-6, which illustrate various methods and method acts that may be performed to implement aspects of the recited disclosure. Although the method acts may be discussed in a certain order or illustrated in a flow chart as occurring in a particular order, no particular ordering is required unless specifically stated, or required because an act is dependent on another act being completed prior to the act being performed.

Referring now to FIG. 4, a method is illustrated as a flowchart 400 having corresponding acts 402, 404, 406, 408, 410, 412, 414 and 416, each of which will now be discussed. This method is implemented from the perspective of an identity provider or a service provider, which may be the same or separate entities, even though they are collectively referred to as an identity provider in this method.

Initially, a request is received by the identity provider for authentication from a primary device associated with a user (act 402). This request can be any request for a service or an initial request for authenticating a device and registering that device with a user account. One or more secondary devices are also registered or otherwise associated with the user account and/or primary device (act 404). These processes are discussed above and can include a plurality of communications back and forth between an identity provider and the primary/secondary devices.

After authenticating the primary device (act 406) a subsequent request for authentication is received (act 408). This request can be a request for continued service or for a new service. The identity provider fails this subsequent request (act 410), however, based on one or more policies or other authentication information stored in the databases accessed by the identity provider, as described above. Then, responsive to failing the subsequent request, the identity provider generates and sends one or more notification(s) to one or more secondary device(s) associated with the user (act 412) in the stored database structures.

Then, after receiving the requisite one or more notification response(s) with the requisite authorization information from the secondary device(s) (act 414), the identity provider responsively re-authenticates the primary device (act 416) for the requested services. This may be done automatically after receiving the notification response and/or after receiving a subsequent request for the services.

The flowchart 500 shown by the flowchart in FIG. 5 is very similar to the method illustrated in FIG. 4, with corresponding acts for receiving a request for authentication (act 502), for registering secondary device(s) (act 504), for authenticating a primary device (act 506), for receiving the notification response(s) (act 512) and for re-authenticating the primary device (act 514).

However, rather than requiring the identity provider to proactively send the notifications (act 412 of FIG. 4), this method allows the identity provider to simply provide the notification. This enables both proactively 'push' the notification or to passively enable another a device to 'pull' or access the notification when a user logs into the interfaces of the identity provider, for example.

This method also provides an act of detecting a failure condition associated with the authentication of the primary device by the identity provider and/or the service provider (act 508). Various implementations for detecting the failure condition are discussed above, any combination of which can be used.

FIG. 6 illustrates yet another flowchart 600 of a method for resolving authenticating issues. In this method, it is not necessarily required (although it is permitted) for the primary device to have already established an authenticated state with the identity provider or other service provider. However, a user account is established and stored in an accessible database structure, which associates a user to a primary device and one or more secondary devices.

In this embodiment, a request for a service is received (act 602) from the user's primary device. This request is automatically failed, however, based on the primary device not having a requisite authentication state in the stored database. The request remains failed until one or more notifications are received from the requisite secondary device(s) associated with the user and/or primary device (act 604) that have the requisite authorizations from the user and/or secondary device(s).

As before, appropriate notification(s) will be sent to the requisite secondary device(s) associated with the user in the stored database structures (act 606). Then, upon receiving the corresponding notification response(s) with the appropriate authorization data (act 608), the identity provider will authorize the one or more service for the primary device (act 610).

Once a primary device is authenticated, the primary device can store authentication credentials that are received from the identity provider and which may be transmitted to the identity provider in subsequent service and/or authentication requests.

In other instances, the authenticated device will not store authentication credentials. Instead, the authenticated device will simply transmit identity information, rather than authentication credentials in subsequent authentication requests to validate the authenticated state of the device. This identity information can include any information that identifies the device (e.g., device identification information, model, serial no., software version information, hardware or software configuration information, stored user credential information, port or network address, etc.). In these instances, the identity provider simply validates the authenticated status of the device, based on a comparison of stored registration records at the identity provider with the identity information received from the device with the new service request. Combinations of the foregoing can also be used to persist and recognize authentication states for devices with remote services.

Figure 7:
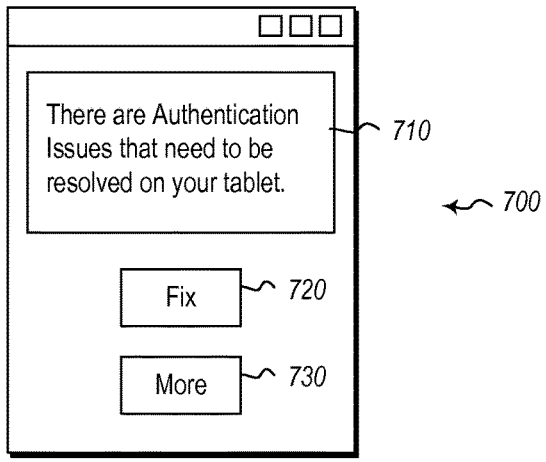
FIG. 7 illustrates an example embodiment of an interface that can be displayed at a secondary device.
Figure 8:
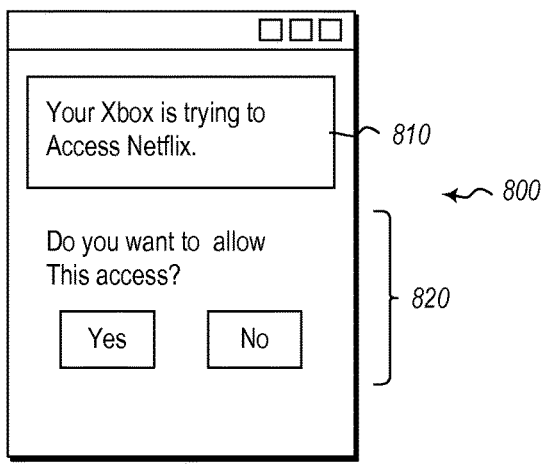
FIG. 8 illustrates an example embodiment of an interface that can be displayed at a secondary device.
Figure 9:
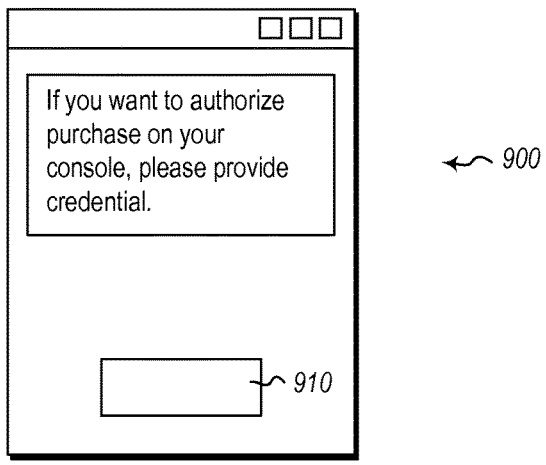
FIG. 9 illustrates an example embodiment of an interface that can be displayed at a secondary device.

Attention will now be directed to FIGS. 7-9, which illustrate example embodiments of interfaces that can be displayed at and/or accessed by the secondary devices (as described above) in association with the notification(s) of the authentication failure event(s).

In some instances, the interfaces (such as interfaces 700, 800 and 900) are generated by the notification modules of the identity provider or the service provider and are included with the notification(s) provided to the secondary devices. In other instances, the interfaces are generated directly by the notification modules of the secondary devices in response to the secondary device(s) receiving the notification(s). Instructions for constructing the interfaces can also be included with the notification(s). Combinations of the foregoing can also be used to generate the interfaces that are generated by, received by and/or presented through the secondary devices.

The specific context referenced in the interfaces and the formatting of the interfaces will vary to correspond to the different types of authentication failure events and/or different user preferences, which can be defined in the stored data structures and notification policies described above. For instance, an interface may correspond directly to a failure event associated with a requested financial transaction, in which case the interface 900 of FIG. 9 or a similar interface may be appropriate. In other instances, the interface may correspond to a failure event associated with a request for multimedia content from a console device, in which case the interface 800 of FIG. 8 or a similar interface may be appropriate. In yet other instances, the interface may correspond to an updated configuration on a device (e.g, a tablet), in which case the interface 700 of FIG. 7 or a similar interface may be appropriate. In other instances, other types and formats of interfaces can also be provided.

The interfaces presented to the user may include any context information, corresponding to the event failure, such as context descriptions 710 and 810 of interfaces 700 and 800. Alternatively, the interfaces do not specifically describe a failure, but instead provide information about requested services, such as the referenced 'purchase' of interface 900 (e.g., wherein the "purchase" can be replaced with any description of a purchase or other requested service).

The information generated and displayed with the interface can also include a prompt or query for the user, such as shown by the question included in the displayed information 820 of interface 800 or the question presented in interface 900.

The interfaces may also be generated with and/or displayed with selectable display objects which, when selected, are operable to trigger the secondary device to generate the notification response(s) described above and/or to cause the identity provider to re-authenticate the primary device and/or for the service provider to grant the service(s) requested by the primary device.

In FIG. 7, the interface 700 includes a selectable 'fix' button which, when selected, triggers a notification response to be generated and sent from the secondary device to the identity provider with sufficient information to trigger the identity provider to re-authenticate the primary device and to update the stored data structures corresponding to the corresponding user and device authentication status.

A 'more' button is also displayed which, when selected, is operable to cause the interface to further display additional information about the authentication issues that need to be resolved. Selection of the 'more' button can also trigger the display of input fields that are operable to receive user input that defines conditions for a subsequent re-authentication to take place for the primary device and which will be reflected in the notification response sent to the identity provider.

In FIG. 8, an interface 800 is displayed with 'yes'/'no' buttons for authorizing a requested service. Selection of the 'yes' button will trigger the generation and transmission of the notification response with an indication that the primary device should be re-authorized and/or that the requested services should be granted. Selection of the 'no' button will either trigger a notification response that indicates that re-authentication should not be granted or it will result in the secondary device refraining from generating and sending the notification response.

In some embodiments, the interface is presented with interface objects, such as input field 910 of interface 900, where a user can provide credential information, such as a pin, a user name, a password, a biometric indicator (e.g., eye scan, fingerprint, etc.), and/or other credential information. The interface can also be configured to request/receive other forms of nontraditional credential information, such as a unique voice signature, a unique swipe, a unique gesture of the device, biometric circulatory indicators or other biometric indicators and/or any other credential information. The interface can also be provided with search objects which, when selected, are operable to scan for and access electronic tokens and other digital data stored on the secondary device that is operable to validate a user credential and/or to include the credential in the notification response.

Receipt of the credential information will, in some instances, trigger the generation and transmission of the notification response(s), with or without the credential information being included in the notification response(s).

Other types of interfaces and combinations of the foregoing interfaces can also be used to facilitate the authentication processes and the resolution of authentication through secondary devices, as described herein, and in such a way as to help address some of the technical problems that are typically associated with authentication failures and re-authentication, without requiring the user to provide credentials at the first device prior to obtaining the re-authentication at the primary device and/or without requiring the primary device to obtain a code to be entered into the secondary device and/or prior to (or without) the primary device being notified of a failure condition associated with the primary device, thereby saving computing resources and user time.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims. Accordingly, all changes which come within the meaning and range of equivalency of the claims are to be embraced within their scope.

What is claimed is:

1. An identity provider system comprising:
   at least one hardware processor configured to execute computer-executable instructions;
   a hardware transmitter configured to transmit communications including one or more notifications to a primary device and one or more secondary devices over one or more network channels;
   a hardware receiver configured to receive communications including one or more authentication requests and responses from the primary device and one or more secondary device over the one or more network channels;
   one or more hardware storage device having one or more stored user account databases and stored computer-executable instructions that are executable by the at least one hardware processor to instantiate the following:
      an authentication component configured for:
         authenticating the primary device to the service provider in response to receiving a request for authentication from the primary device associated with a user;
         receiving a subsequent request for authentication from the primary device to re-authenticate the primary device to the service provider for one or more service or transaction;
         failing the subsequent request to re-authenticate the primary device to the service provider; and
         re-authenticating the primary device to the service provider responsive to receiving a notification response from the one or more secondary devices which are associated with the user by user account information stored in the one or more user account databases; and
      a notification component configured for:
         responsive to the failing of the subsequent request, generating a notification regarding the failing of the subsequent request and sending the notification to the one or more secondary devices that associated with the user in the one more stored user account databases or providing the notification to the user in response to the user accessing the service provider through a network interface, the notification being sent or provided after a predetermined time that is designated for permitting the primary device or network interface to self-resolve the failing; and
         receiving the notification response from the one or more secondary devices.

2. The identity provider system of claim 1, wherein the notification response comprises data that distinguished from a code provided to the primary device during authentication.

3. The identity provider system of claim 1, wherein the notification response includes an indication that an interface object presented in a user interface at the one or more secondary devices was selected by the user.

4. The identity provider system of claim 1, wherein the notification response includes a biometric indicator received or detected at the one or more secondary devices.

5. The identity provider system of claim 1, wherein the notification response includes character input entered by a user at the one or more secondary device.

6. The identity provider system of claim 1, wherein the notification response is provided automatically by the secondary device when a predetermined response condition exists at the secondary device, wherein the predetermined response condition includes at least one of a user biometric condition detectable by the secondary device, a proximity state between the secondary device and the primary device, or a status of connectivity between the secondary device and the primary device.

7. The identity provider system of claim 1, the authentication component authenticates the primary device to the service provider in response to receiving a code from the one or more secondary devices which was provided to the primary device from the identity provider system in response to the request for authentication.

8. The identity provider system of claim 1, wherein the notification is provided to the user in response to the user accessing the identity provider through a network interface on a device other than the primary device.

9. The identity provider system of claim 1, wherein re-authenticating the primary device to the service provider only occurs when the notification response is received within a predetermined time from the notification being sent, based on an expiration parameter associated with the notification.

10. The identity provider system of claim 1, wherein the notification component is further configured to selectively identify the one or more secondary devices to send the notification to, from a plurality of different secondary devices associated with the user in the one or more user account databases, based on one on more attributes of the one or more service or transaction.

11. The identity provider system of claim 1, wherein the notification component is further configured to send the notification to a third party through the one or more secondary devices based on the request for re-authentication and based on one on more attributes of the one or more service or transaction.

12. The identity provider system of claim 1, wherein the notification specifies one or more types of required data to be submitted with the notification response and which must be received from the one more secondary devices prior to re-authenticating the primary device.

13. The identity provider system of claim 1, wherein failing the subsequent request to re-authenticate the primary device to the service provider occurs in response to detecting one or more of an expiration or other change in user credentials, a security event, or a detected update.

14. The identity provider system of claim 1, wherein failing the subsequent request to re-authenticate the primary device to the service provider occurs in response to detecting the subsequent request comprises a request for a particular type of one or more service or transaction.

15. The identity provider system of claim 14, wherein the particular type of the one or more service or transaction comprises a purchase.

16. The identity provider system of claim 14, wherein the particular type of the one or more service or transaction comprises a request for access to restricted data.

17. The identity provider system of claim 1, wherein the notification component is further configured to establish a notification channel for communicating with the one or more secondary devices based on user account information stored in the one or more user account database that defines parameters for establishing the notification channel.

18. A secondary computing system configured for facilitating re-authentication of a primary device to an identity provider, the secondary computing system comprising:
at least one hardware processor configured to execute computer-executable instructions;
a hardware transmitter configured to transmit communications including one or more authentication communications and notification responses to an identity provider over one or more network channels;
a hardware receiver configured to receive communications including one or more notifications from the identity provider over the one or more network channels;
one or more hardware storage device having one or more stored computer-executable instructions that are executable by the at least one hardware processor to instantiate the following:
a notification component which:
receives a notification regarding failing of a re-authentication request submitted by a primary device to re-authenticate the primary device with a service provider, the primary device having been previously authenticated with the service provider, and the primary device being associated with the secondary computing system by stored user account information; and
responsive to the notification, generates and transmits a notification response to the identity provider which is operable to cause the identity provider to re-authenticate the primary device to a service provider, the notification being sent or provided after a predetermined time that is designated for permitting the primary device or network interface to self-resolve the failing.

19. The secondary computing system of claim 18, wherein the stored computer-executable instructions that are executable by the at least one hardware processor to instantiate a notification interface which displays one or more interactive object in response to the notification and that is operable to receive user input that is used to generate the notification response.

20. A computer-implemented method for utilizing a secondary device for facilitating resolution of authenticating issues between a primary device and a service provider, the method being implemented by an identity provider system comprising:
the identity provider computing system authenticating a primary device to a service provider responsive to a request for authentication that is received from the primary device, the primary device being associated with a user by user account data stored by the identity provider;
the identity provider computing system receiving a subsequent request for authentication from the primary device to re-authenticate the primary device to the service provider;
the identity provider computer system failing the subsequent request to re-authenticate the primary device to the service provider;
the identity provider computer system, responsive to failing the subsequent request, sending a notification to a secondary device that is also associated with the user by the user account data stored by the identity provider;
the identity provider computer system receiving a notification response from the secondary device, the notification being sent to the identify provider after a predetermined time that is designated for permitting the primary device or network interface to self-resolve the failing; and
the identity provider computer system, responsive to receiving the notification response from the secondary device, re-authenticating the primary device to the service provider.

* * * * *